3,306,863
NON-IONIC POLYOXYETHYLENE SURFACTANT-
ETHYLENE-MALEIC ANHYDRIDE COPOLYMER
PRINTING COMPOSITIONS
George J. Leitner, Peekskill, N.Y., assignor to Geigy
Chemical Corporation, Greenburgh, N.Y., a corporation of Delaware
No Drawing. Filed Jan. 2, 1964, Ser. No. 335,415
14 Claims. (Cl. 260—8)

This invention relates to compositions useful in the textile decorating art. More particularly the present invention pertains to extender emulsion compositions for use in pigment printing.

Pigment printing vehicles are generally comprised of mineral spirits, water, colloidal thickeners, surfactants, dispersants, resins and the like. In preparing print pastes, this vehicle or extender is combined with color concentrates or pigment dispersions, a latex binder and other optional ingredients.

It is an object of the present invention to provide oil-in-water extender compositions which demonstrate improved physical properties such as superior emulsion stability and viscosity, as well as being more efficient and economical in their preparation and use.

Another object of the present invention is to provide an improved method of decorating textile material employing such extender compositions. Prints so prepared exhibit improved color value, better wash fastness and improved crocking resistance. Furthermore, prints made with these highly efficient extenders contain less solids and accordingly have improved hand. This factor is of great importance particularly when printing on synthetic fabrics and blends of synthetic and natural fibers.

Another object of the present invention is to provide improved extender compositions for aqueous printing compositions such as are used in screen printing.

Other objects of this invention will be apparent from the following description and examples.

This invention embraces a composition of matter comprising an alkali metal or volatile amine salt of the reaction product of (a) a non-ionic ethylene oxide-derived surfactant and (b) a solid linear or crosslinked unhydrolyzed ethylene-maleic anhydride copolymer. By the term "ethylene oxide-derived surfactant" is intended the non-ionic polyoxyethylene condensation product of ethylene oxide and a lipophile such as alkylphenol, e.g., octylphenols and nonylphenols, a higher alkanol, including fatty alcohols of natural origin and synthetic straight and branch-chained alcohols, sorbitan, sorbitan partial fatty esters, glycerides such as castor oil and the like. Such non-ionic polyoxyethylene surfactants derived from ethylene oxide and a lipophile are widely known and used in the chemical arts as detergents, surfactants and the like. A particularly useful series for use in the present invention are those obtained from p-tertiary-octylphenol and ethylene oxide, members of which contain the equivalent of from about three to about forty moles of ethylene oxide per mole of p-tertiary-octylphenol.

Ethylene-maleic anhydride copolymer may be represented by the formula:

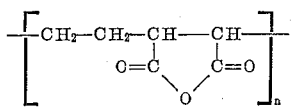

wherein $n$ may vary from a two digit figure to a three digit figure. The material is commercially available in low, intermediate, high and very high molecular weights. While ethylene-maleic anhydride copolymers of any molecular weight are suitable for the present invention, the best results are generally observed with copolymers of the higher molecular weights.

Either linear or crosslinked material may be used, the crosslinked being preferred.

Other olefin-maleic anhydride copolymers may also be used. Such olefins include the more readily obtainable petroleum fractions such as propylene, isobutylene, butene-1 and diisobutene. Methods of preparing the corresponding copolymers are set forth for example in U.S. Patent 2,378,629.

Maleic anhydride derived copolymers of styrene, vinyl ethyl ether, vinyl methyl ether, vinyl acetate, methyl methacrylate and vinyl chloride may also be used in preparing the compositions of this invention.

The compositions of this invention are prepared by combining from about 0.5 to about 5 parts of ethylene oxide-derived surfactant with about 5 parts of the ethylene-maleic anhydride copolymer and heating from about 50 to about 90° C., preferably 60 to 80° C. The reaction can be simply executed in aqueous media with agitation. Upon completion of the heating step, the material is treated with a base such as sodium, potassium or ammonium hydroxide to obtain the salt.

The selection of the ratio of reactants depends upon the specific application and composition of the desired final printing composition. Thus maximum viscosity is generally obtained when the ratio of surfactant to copolymer is 0.5–1:5. Higher ratios however within the range of 1–5:5 are not only highly satisfactory but also produce superior compositions in certain instances.

While the reaction product can be isolated, such is unnecessary since the aqueous suspension of the product obtained as the salt can be directly used in formulating the extender concentrate preparation.

Thus there may be added directly to the product, various other substances as for example, ionic surfactants such as ammonium and/or lauryl sulfate; fatty acids and esters such as oleic and stearic acids, glyceryl esters and the like; auxiliary thickening agents such as methyl cellulose, hydroxyethyl cellulose, sodium polyacrylate and casein; antifoam agents such as silicone oils, high molecular weight fatty esters, alcohols and the like; mineral spirits; resin binders such as butylated melamine-formaldehyde resins, epoxy resins and the like. While the chemical nature and function of such additional ingredients may vary widely, it is significant that the final printing composition prepared according to this invention demonstrates considerably improved stability over previous compositions whose emulsion stabilities were often impaired by the presence of such added substances, e.g., salts, ionic surfactants and the like.

Of particular importance in the present invention is the considerable cost saving which can be realized through use of these novel extender compositions. Thus the high viscosity of this product and its excellent emulsion stability mean that far less auxiliary thickener is required. Furthermore, due to the greatly increased thickening efficiency of the extender concentrates of this invention, very satisfactory extenders of good viscosity can be prepared with as little as 0.75% of extender concentrate in water and mineral spirits.

In practice, an extender concentrate is prepared in which each 1000 parts contains the reaction product of from about 5 to about 50 parts of the polyoxyethylene surfactant derived from ethylene oxide and a lipophile and about 50 parts of the ethylene-maleic anhydride copolymers as described above. The remainder of the extender concentrates may be comprised of water and a variety of other ingredients as indicated above and more fully exemplified hereafter. These ingredients may or may not include auxiliary thickening agents such as casein and/or methyl cellulose and organic solvent soluble resins such as modified alkyd resins, thermo-setting melamine-formaldehyde resins and epoxy resins.

Generally extender concentrates are sold in the art as such with preparation of the extender being performed at the site of and at the time of the printing operation. The extender concentrates prepared according to the present invention in addition to various known constituents will contain from 1 to 40% of the reaction product of the polyoxyethylene surfactant and ethylene-maleic anhydride copolymer. Such compositions may also contain from zero to about 25% auxiliary stabilizers such as methyl cellulose, the total of such auxiliary stabilizers and the composition of this invention being no greater than 50%.

The extender is usually prepared by dispersing from about 1 to about 2 parts of the extender concentrate in from about 40 to about 55 parts of water followed by emulsification with sufficient mineral spirits to bring the final extender composition to 100 parts. This extender is then combined with a latex binder and color concentrates to arrive at the final printing composition, the amount of the extender used being naturally dependent on the particular color concentrates employed and the printing shade desired.

Latices commonly used in the textile decorating arts include acrylate polymers, polymers of acrylates and methacrylates, polymers of acrylates with acrylonitrile, polymers of acrylic esters with butadiene, polymers of acrylic esters with vinyl chloride, polymers of butadiene and styrene, polymers of butadiene and acrylonitrile, polymers of butadiene, acrylonitrile and styrene, carboxylated polymers of butadiene and styrene, carboxylated polymers of butadiene and acrylonitrile, carboxylated acrylic ester polymers and others. In addition mixtures of latices can be used, as can combinations of latices and thermosetting resins or crosslinking agents. Formulations of this latter type are described in U.S. Patent 3,095,320.

Another component common to many print pastes is a latent acid catalyst. These compounds serve as activators for thermosetting components or as crosslinking promoters for reactive groups (carboxylic, amide, hydroxyl, epoxy, etc.) present in the binder, extender and/or color concentrates used in the print paste formulation.

A latent acid catalyst may be defined as a chemical entity containing a basic element volatile on heating and an acid catalytic element. Thus for example, ammonium nitrate, ammonium thiocyanate, ammonium sulfate, ammonium chloride, diammonium phosphate are all useful latent acid catalysts. Also employable are the amine salts of mineral acids. Generally a latent acid catalyst is used in about 0.025 to 4% by total weight of the print paste.

Even in the presence of such diverse ingredients, the compositions of the present invention demonstrate superior stability and efficiency.

The following examples will serve to further typify the nature of this invention without limiting the scope thereof. Unless otherwise specified, parts are by weight.

*Example 1*

One hundred and fifty parts of water, 60 parts of ethylene oxide-octylphenol condensate (30 mole:1 mole) and 180 parts of ethylene-maleic anhydride copolymer are heated to 75° C. with agitation for one-half hour. After cooling to room temperature, 200 parts of ammonium hydroxide are added so as to arrive at a final pH of from 9 to 9.5. The following are then added:

| | Parts |
|---|---|
| Ammonium lauryl sulfate | 200 |
| A melt of: | |
| (a) Stearic acid | 10 |
| (b) Glyceryl monostearate | 50 |
| Butylated melamine-formaldehyde resin | 75 |
| Methyl cellulose, 4000 cps. | 30 |
| Mineral spirits | 45 |
| | 1000 |

A 2% extender prepared from the above concentrate with 49% water and 49% mineral spirits exhibits a viscosity of 34,200 cps. 80° F. (Brookfield).

A print paste is prepared with this extender as follows:

| | Percent |
|---|---|
| Benzidine yellow AAMX dispersion | 20 |
| Carboxylic butadiene acrylonitrile latex | 15 |
| 2% extender | 65 |
| | 100 |

Prints are made on cotton and a blend of cotton and dacron and cured at 300° F. for three minutes. Color value, handle and wash fastness (AATCC No. 3 Wash Test) are all very good.

*Example 2*

Thirty parts of ethylene oxide-octylphenol surfactant and 50 parts of ethylene-maleic anhydride resin in 121 parts of water are heated at 60° to 80° C. with agitation for 15 to 30 minutes and allowed to cool to room temperature.

To the cooled product so obtained (201 parts) are added 115 parts of 28% aqueous ammonium hydroxide. The following are then added:

| | Parts |
|---|---|
| 30% aqueous ammonium lauryl sulfate | 150 |
| Sodium lauryl sulfate | 30 |
| A melt of: | |
| (a) Stearic acid | 10 |
| (b) Glyceryl monolaurate | 50 |
| A solution of: | |
| (a) Butylated melamine - formaldehyde resin in | 165 |
| (b) In methyl amyl alcohol | 40 |
| Methyl cellulose, 4000 cps. grade | 110 |
| Antifoam agent | 2 |
| Fumed silica | 2 |
| Mineral spirits | 125 |
| | 1000 |

The above are thoroughly mixed.

The extender is prepared by dispersing from 1 to 2 parts of this extender concentrate in 40 to 55 parts of water followed by emulsification with sufficient mineral spirits to bring the total volume up to 100 parts.

Typical printing compositions are then prepared as follows:

HEAVY SHADE

| | Parts |
|---|---|
| Extender | 65 |
| Butadiene styrene copolymer latex binder | 15 |
| Phthalocyanine blue color concentrate | 20 |

MEDIUM SHADE

| | |
|---|---|
| Extender | 85 |
| Butadiene styrene copolymer latex binder | 10 |
| Phthalocyanine blue color concentrate | 5 |

LIGHT SHADE

| | |
|---|---|
| Extender | 94 |
| Butadiene styrene copolymer latex binder | 5 |
| Phthalocyanine blue color concentrate | 1 |

The above color concentrate is prepared from the following:

| | Parts |
|---|---|
| Phthalocyanine blue pigment | 15.0 |
| Water | 57.6 |
| Sodium lauryl sulfate | 2.8 |
| Sodium diisopropylnaphthalene sulfonate | 2.4 |
| Casein | 1.5 |
| Methyl cellulose, 15 cps. | 1.5 |
| Butylated melamine-formaldehyde resin | 7.5 |
| Antifoam agent | 0.2 |
| Xylol | 7.5 |
| Mineral spirits | 4.0 |
| | 100.0 |

Color concentrates of other commonly used pigments may similarly be used. Representative of these are the following:

| | |
|---|---|
| Carbon black | Black |
| Titanium dioxide | White |
| Phthalocyanine green | Green |
| Benzidine yellow AAOT | Yellow |
| Dianisidine orange | Orange |
| Azo red ITR | Red |
| Quimacridone reds | Pink |
| Carbazole dioxazine | Violet |

*Example 3*

One hundred and eighty parts of water, 80 parts of castor oil-ethylene oxide condensate and 100 parts of ethylene-maleic anhydride copolymer are heated to 80° F. with agitation for one-half hour. There is then added 150 parts of ammonium hydroxide. To this product is then added:

| | Parts |
|---|---|
| Diethanol amine | 20 |
| Stearic acid | 20 |
| 18% casein solution | 60 |
| Methyl cellulose, 15000 cps. | 200 |
| Mineral spirits | 190 |
| | 1000 |

An "all aqueous" emulsion is prepared with 2% of this concentrate and 98% water. This viscous emulsion is suitable for preparing print pastes for the screen printing of cotton and rayon fabrics.

*Example 4*

Fifteen parts of polyoxyethylated stearyl alcohol (prepared from 20 moles of ethylene oxide/mole stearyl alcohol) and 50 parts of ethylene-maleic anhydride copolymer in 118 parts of water are heated with agitation for one-half hour at from 60 to 80° C. The product is allowed to cool and 115 parts of 28% aqueous ammonium hydroxide are added. The following are then added:

| | Parts |
|---|---|
| 30% aqueous sodium lauryl sulfate | 30 |
| 35% aqueous ammonium alkylbenzene sulfonate | 150 |
| A solution of: | |
| (a) Butylated melamine-formaldehyde resin in | 185 |
| (b) Hexyl alcohol | 40 |
| Stearic acid | 20 |
| Methyl cellulose, 4000 cps. grade | 130 |
| Mineral spirits | 145 |
| Antifoam agent | 2 |
| | 1000 |

A 2% extender emulsion of the above prepared with 44% water and 54% mineral spirits (all percentages by volume) exhibited a viscosity of 50,500 cps., 83° F. (Brookfield).

*Example 5*

Fifty parts of ethylene oxide-octylphenol surfactant and 100 parts of high viscosity ethylene-maleic anhydride copolymer in 201 parts of water are heated at 75° C. with agitation for one-half hour. The extremely heavy paste thus obtained is allowed to cool and 200 parts of ammonium hydroxide are added. The following are next added:

| | Parts |
|---|---|
| 30% aqueous ammonium lauryl sulfate | 150 |
| Sodium lauryl sulfate | 30 |
| Stearic acid | 10 |
| Glyceryl monostearate | 50 |
| A solution of: | |
| (a) Butylated melamine-formaldehyde resin in | 165 |
| (b) Octyl alcohol | 40 |
| Silicone antifoam agent | 4 |
| | 1000 |

The above extender concentrate demonstrates a viscosity of 47,700 cps., at 84° F (Brookfield) as a 2% clear emulsion in 44% water and 54% mineral spirits, (percentages by volume).

What is claimed is:

1. A composition comprising a salt selected from the group consisting of the alkali metal and volatile amine salts of the reaction product at a temperature of about 50° C. to about 90° C. of
   (a) from about 0.5 to about 5 parts of a non-ionic polyoxyethylene surfactant derived from a lipophile and about 3 to about 40 molar equivalants of ethylene oxide and
   (b) about 5 parts of a solid unhydrolyzed ethylene-maleic anhydride copoylmer, wherein said ethylene and maleic anhydride are present in approximately a 1 to 1 molar ratio.

2. A composition comprising water and a member selected from the group consisting of the alkali metal and volatile amine salt of the reaction product at a temperature of about 50° C. to about 90° C. of
   (a) from about 0.5 to about 5 parts of the condensate of p-tertiary-octylphenol and from 3 to 40 molar equivalents of ethylene oxide and
   (b) about 5 parts of a solid unhydrolyzed ethylene-maleic anhydride copoylmer, wherein said ethylene and maleic anhydride are present in approximately a 1 to 1 molar ratio.

3. A composition comprising water and a member selected from the group consisting of the alkali metal and volatile amine salts of the reaction product at a temperature of about 50° C. to about 90° C. of
   (a) from about 0.5 to about 3 parts of the condensate of p-tertiary-octylphenol and about 40 molar equivalents of ethylene oxide and
   (b) about 5 parts of a high molecular weight solid unhydrolyzed ethylene-maleic anhydride copolymer, wherein said ethylene and maleic anhydride are present in approximately a 1 to 1 molar ratio.

4. A printing extender concentrate comprising water and from about 1 to about 40% of a member selected from the group consisting of the alkali metal and volatile amine salts of the reaction product at a temperature of about 50° C. to about 90° C. of
   (a) from about 0.5 to about 5 parts of a non-ionic polyoxyethylene surfactant derived from a lipophile and from about 3 to about 40 molar equivalents of ethylene oxide and
   (b) about 5 parts of a solid unhydrolyzed ethylene-maleic anhydride copolymer, wherein said ethylene and maleic anhydride are present in approximately a 1 to 1 molar ratio.

5. A printing extender concentrate according to claim 4 wherein the lipophile is octylphenol.

6. A printing extender concentrate according to claim 4 wherein the lipophile is castor oil.

7. A printing extender concentrate according to claim 4 including methyl cellulose.

8. A printing extender concentrate according to claim 4 including casein.

9. A printing extender concentrate according to claim 4 including hydroxyethyl cellulose.

10. A printing extender concentrate according to claim 7 including a butylated melamine-formaldehyde resin.

11. A printing extender concentrate according to claim 8 including a butylated melamine-formaldehyde resin.

12. A printing extender concentrate according to claim 9 including a butylated melamine-formaldehyde resin.

13. A printing extender concentrate according to claim 5 including methyl cellulose.

14. A printing extender concentrate according to claim 13 including a butylated melamine-formaldehyde resin.

References Cited by the Examiner

UNITED STATES PATENTS

| | | | |
|---|---|---|---|
| 2,790,735 | 4/1957 | McLaughlin | 260—29.6 XR |
| 2,865,878 | 12/1958 | Toothill et al. | 260—29.6 |
| 3,000,840 | 9/1961 | Johnson et al. | 260—29.6 XR |
| 3,017,377 | 1/1962 | Kuhn | 260—8 |
| 3,197,409 | 7/1965 | De Vries | 260—78.4 |

WILLIAM H. SHORT, *Primary Examiner.*

E. M. WOODBERRY, *Assistant Examiner.*